United States Patent
Chang et al.

(10) Patent No.: US 10,388,317 B2
(45) Date of Patent: Aug. 20, 2019

(54) DISK PICK-AND-PLACE DEVICE AND OPERATING METHOD THEREOF

(71) Applicant: LITE-ON TECHNOLOGY CORPORATION, Taipei (TW)

(72) Inventors: Jung-Fang Chang, Taipei (TW); Cheng-Wen Huang, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/239,705

(22) Filed: Jan. 4, 2019

(65) Prior Publication Data

US 2019/0147911 A1    May 16, 2019

Related U.S. Application Data

(62) Division of application No. 15/864,129, filed on Jan. 8, 2018, now Pat. No. 10,210,897.

(60) Provisional application No. 62/562,549, filed on Sep. 25, 2017.

(30) Foreign Application Priority Data

Nov. 7, 2017   (CN) .......................... 2017 1 1083853

(51) Int. Cl.
    *G11B 17/02*     (2006.01)
    *G11B 17/028*    (2006.01)
    *G11B 17/08*     (2006.01)

(52) U.S. Cl.
    CPC .......... *G11B 17/0284* (2013.01); *G11B 17/08* (2013.01)

(58) Field of Classification Search
    None
    See application file for complete search history.

(56) References Cited

U.S. PATENT DOCUMENTS

| | | | |
|---|---|---|---|
| 5,011,287 A * | 4/1991 | Mino | G01B 9/02097 356/496 |
| 5,829,739 A * | 11/1998 | Hofmann | G11B 5/84 269/43 |
| 6,111,847 A * | 8/2000 | Assadian | B25J 15/028 294/97 |
| 6,233,218 B1 | 5/2001 | Hoffmann | |
| 6,396,796 B1 | 5/2002 | Kletzl | |
| 6,459,673 B1 | 10/2002 | Becker et al. | |

(Continued)

OTHER PUBLICATIONS

Xu Hong et al., "Disc counting device and disc counting method for disc grabber, and disc grabber." Published Dec. 10, 2014CN 104200819 A. (Year: 2014).*

Primary Examiner — William J Klimowicz
(74) Attorney, Agent, or Firm — McClure, Qualey & Rodack, LLP (57) ABSTRACT

A disc pick-and-place device including a disc pick-and-place body and a quantity sensing unit is provided. The disc pick-and-place body is for clamping and unloading at least one disc. The quantity sensing unit is disposed on the disc pick-and-place body for sensing the quantity of the at least one disc clamped on the disc pick-and-place body. The quantity sensing unit includes a movable piece and an optical distance measuring device. The movable piece leans on at least one disc and moves as the quantity of the at least one disc changes. The optical distance measuring device is for emitting a beam and receiving the beam reflected from the movable piece to detect the quantity of the at least one disc.

4 Claims, 8 Drawing Sheets

(56) References Cited

U.S. PATENT DOCUMENTS

| | | |
|---|---|---|
| 6,959,444 B2 | 10/2005 | Peng |
| 9,349,416 B2 * | 5/2016 | Okamoto ............ G11B 33/0444 |
| 9,761,265 B2 * | 9/2017 | Chihara ............... G11B 17/223 |
| 9,799,367 B1 | 10/2017 | Zhu et al. |
| 10,008,235 B1 * | 6/2018 | Chang .................... G11B 17/08 |
| 10,210,897 B1 * | 2/2019 | Chang ................ G11B 17/0284 |
| 10,262,687 B1 * | 4/2019 | Chang .................. G11B 17/054 |
| 2001/0043552 A1 | 11/2001 | Takemasa et al. |
| 2004/0210918 A1 | 10/2004 | Peng |
| 2005/0100434 A1 * | 5/2005 | Filep ........................ B25J 15/10 |
| | | 414/796 |
| 2010/0100895 A1 | 4/2010 | Hernandez |
| 2014/0003899 A1 * | 1/2014 | Okamoto ........... G11B 33/0444 |
| | | 414/618 |

\* cited by examiner

DISK PICK-AND-PLACE DEVICE AND OPERATING METHOD THEREOF

This application is a divisional application of U.S. application Ser. No. 15/864,129, filed Jan. 8, 2018, now U.S. Pat. No. 10,210,897, which claims the benefits of U.S. provisional application Ser. No. 62/562,549, filed Sep. 25, 2017 and People's Republic of China application Serial No. 201711083853.6, filed Nov. 7, 2017, the subject matters of which are incorporated herein by reference.

BACKGROUND OF THE INVENTION

Field of the Invention

The invention relates in general to a pick-and-place device, and more particularly to a disc pick-and-place device and an operating method thereof.

Description of the Related Art

The disc database, which uses discs as a data storage medium, normally includes multiple drives, a disc library for placing multiple discs, and a disc pick-and-place device. The disc pick-and-place device is for picking up and unloading discs, and moving discs between the disc library and the drives. For example, the disc pick-and-place device picks up a disc from the disc library and then moves and unloads the disc to the drive, or picks up a disc from the drive and then moves and unloads the disc to the disc library. To increase the disc handling efficiency, the disc pick-and-place device may clamp multiple discs and then move the multiple discs at one time. For example, the disc pick-and-place device picks up multiple discs from the disc library and then moves and unloads the multiple discs to their corresponding drives respectively. The disc pick-and-place device picks up discs from respective drives and then clamps the discs on the disc pick-and-place device. Then, the disc pick-and-place device unloads the clamped discs to the disc library.

Although the disc pick-and-place device may clamp multiple discs and then move the multiple discs at one time, normally one drive can only access one single disc. Therefore, how to provide a disc pick-and-place device capable of unloading each of the clamped discs to its corresponding drive has become a prominent task for people in the technology field of the invention.

Additionally, in order to determine the quantity of the discs clamped on the disc pick-and-place device, the disc pick-and-place device normally obtains a total height of the clamped discs according to the displacement of a probe, and then uses the total height of the clamped discs as a basis for determining the disc quantity of the clamped discs. According to the above determination method, a probe structure is disposed on one side of the disc pick-and-place device, such that the probe can lean on a surface of the clamped discs. However, the probe directly contacts the disc surface, and therefore may easily scratch or damage the disc.

SUMMARY OF THE INVENTION

The invention is directed to a disc pick-and-place device and an operating method thereof for picking up and placing discs.

According to one embodiment of the present invention, a disc pick-and-place device for picking and clamping multiple discs and unloading the multiple discs is provided. The disc pick-and-place device includes a supporting body, multiple picking members and a driver. The picking members are disposed around a support body and flexibly abut the edges of the discs. Each picking member includes a flexible rod, a first carrying portion and a second carrying portion. The first carrying portion and the second carrying portion are located on the flexible rod and separated by an interval. The first carrying portion and the second carrying portion partly overlap with each other in an axial direction of the flexible rod. The driver is for driving each flexible rod to rotate and move each first carrying portion and each second carrying portion to a disc releasing position or a disc holding position.

According to another embodiment of the present invention, an operating method of a disc pick-and-place device is provided. The disc pick-and-place device includes multiple picking members flexibly abutting the edges of multiple discs. Each picking member includes a flexible rod, a first carrying portion and a second carrying portion. The operating method includes following steps: when the disc pick-and-place device intends to pick up discs, each flexible rod is driven to rotate and make the disc pick-and-place device enter a first operating state in which each first carrying portion and each second carrying portion are located at the disc releasing positions; each flexible rod is driven to rotate and make the disc pick-and-place device enter a second operating state in which the first carrying portion is located at the disc holding position, and the second carrying portion is located at the disc releasing position. When the disc pick-and-place device intends to unload a plurality of discs, each flexible rod is driven to rotate and make the disc pick-and-place device enter a third operating state in which both the first carrying portion and the second carrying portion are located at the disc holding positions; each flexible rod is driven to rotate and make the disc pick-and-place device enter a fourth operating state in which the first carrying portion is located at the disc releasing position, and the second carrying portion is located at the disc holding position.

According to an alternate embodiment of the present invention, a disc pick-and-place device including a disc pick-and-place body and a quantity sensing unit is provided. The disc pick-and-place body is for clamping and unloading at least one disc. The quantity sensing unit is disposed on the disc pick-and-place body for sensing the quantity of the at least one disc clamped on the disc pick-and-place body. The quantity sensing unit includes a movable piece and an optical distance measuring device. The movable piece leans on at least one disc and moves as the quantity of the at least one disc changes. The optical distance measuring device is for emitting a beam and receiving the beam reflected from the movable piece to detect the quantity of the at least one disc.

According to another alternate embodiment of the present invention, an operating method of a disc pick-and-place device is provided. The disc pick-and-place device includes a disc pick-and-place body and a movable piece. The disc pick-and-place body is for clamping and unloading at least one disc. The movable piece leans on at least one disc and moves as the quantity of the at least one disc changes. The operating method includes: emitting a beam and receiving the beam reflected from the movable piece to detect the quantity of the at least one disc; and determining whether the quantity of the at least one disc clamped on the disc pick-and-place body matches a correct disc quantity.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
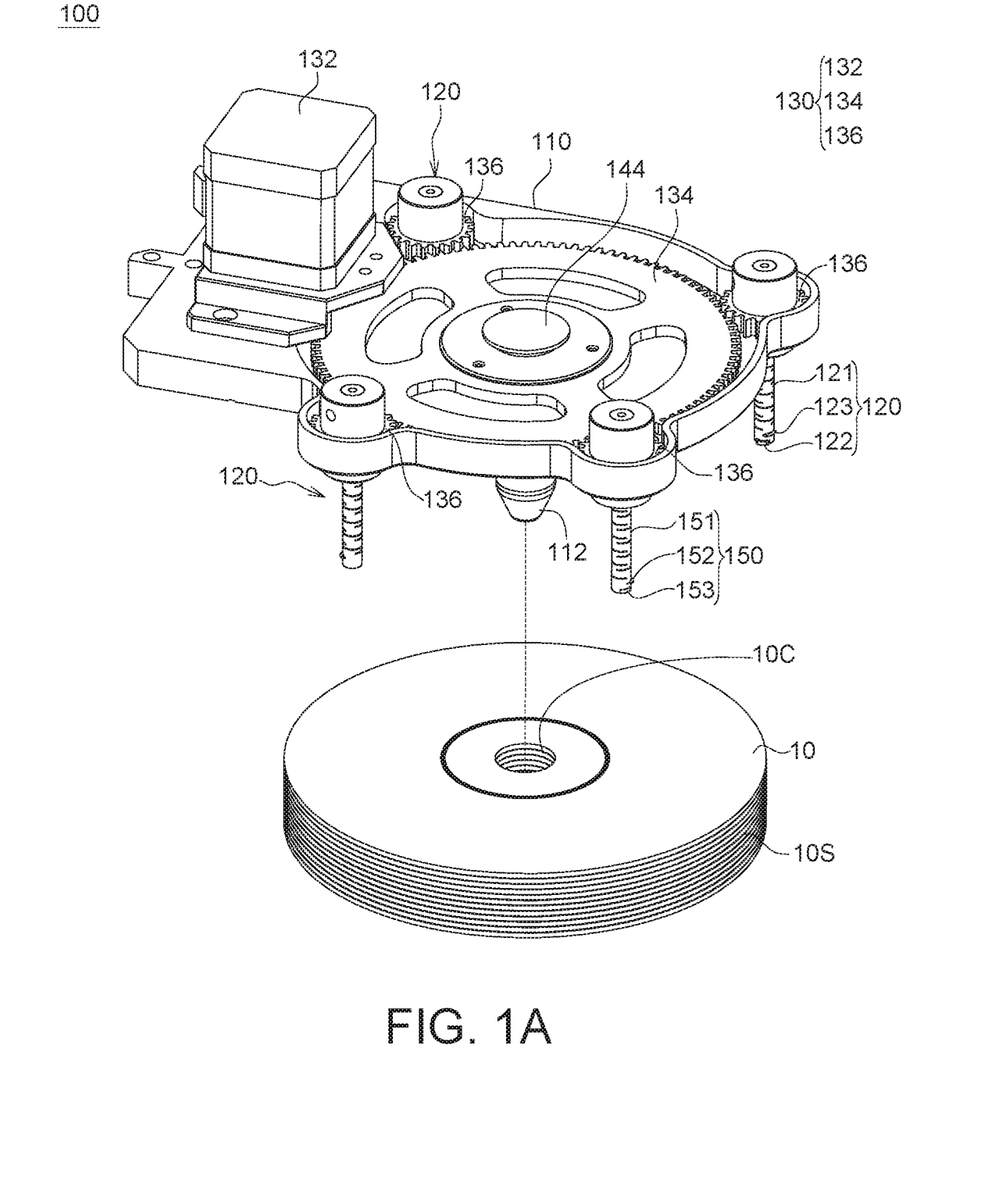
FIGS. 1A and 1B are perspective views of a disc pick-and-place device according to an embodiment of the invention.
Figure 1B:
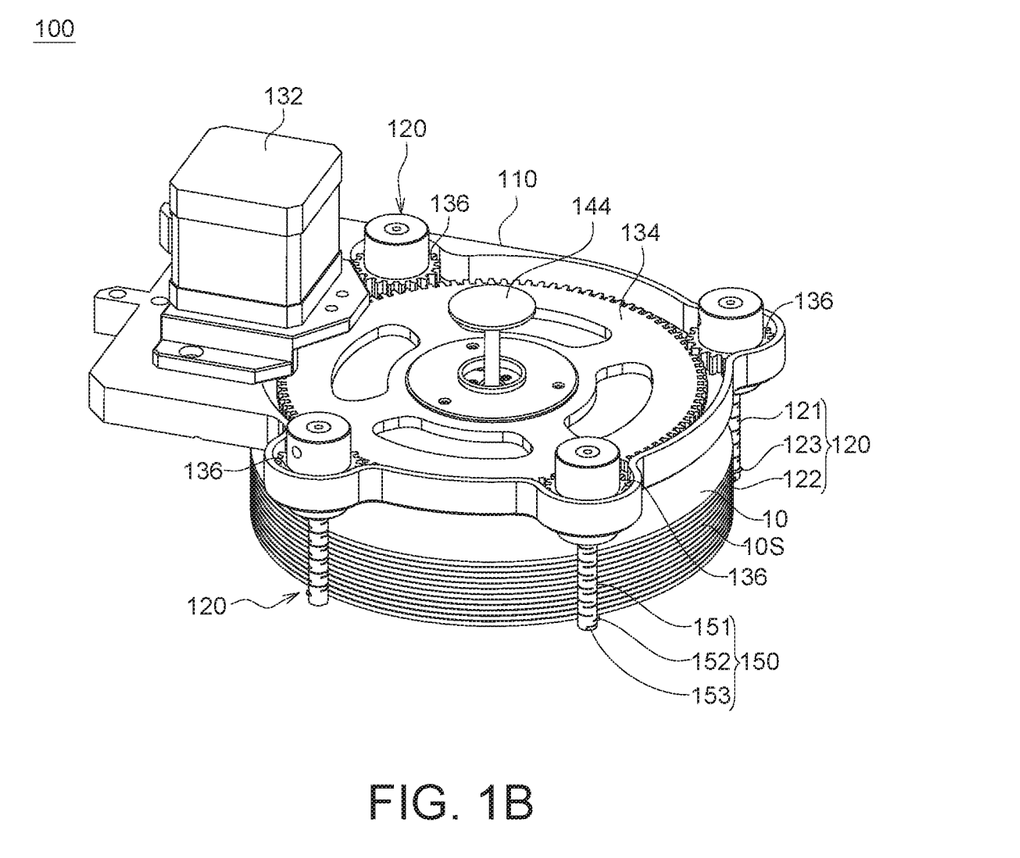
Figure 1C:
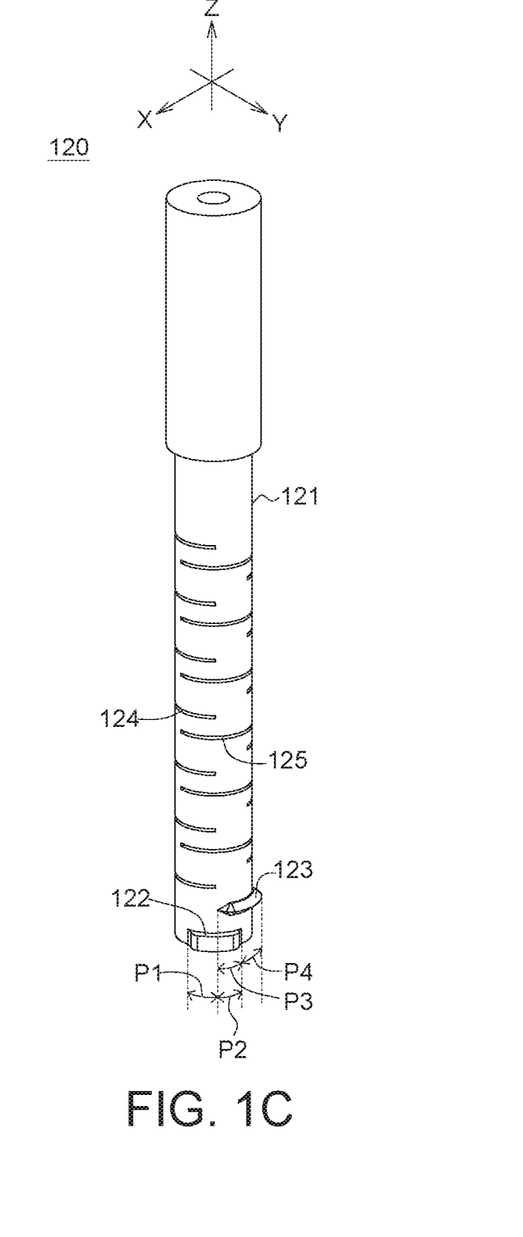
FIGS. 1C and 1D are perspective view of a picking member and a flicking member respectively according to an embodiment of the invention.
Figure 1D:
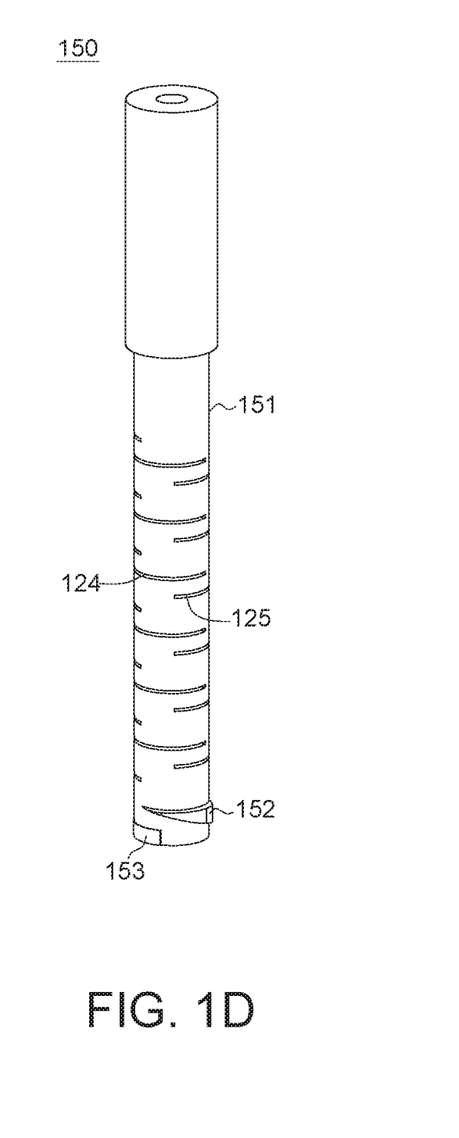

FIGS. 1A and 1B are perspective views of a disc pick-and-place device 100 before picking up discs and after picking up discs respectively according to an embodiment of the invention. FIGS. 1C and 1D are perspective view of a picking member 120 and flicking member 150 respectively according to an embodiment of the invention. FIGS. 2A-2D are schematic diagrams of a disc pick-and-place device 100 in a first operating state, a second operating state, a third operating state, and a fourth operating state respectively and an enlarged view of the leaning portion between the disc pick-and-place device and the discs.

Refer to FIGS. 1A and 1B. The disc pick-and-place device 100 according to an embodiment of the invention is for picking up and clamping the discs 10 and further unloading the discs 10 to multiple disc drives. In the present embodiment, the disc pick-and-place device 100 includes a supporting body 110, multiple picking members 120 and a driver 130. The supporting body 110 has a center column 112, which can be inserted into the center hole 10C of multiple stacked discs 10. The multiple picking members 120 can flexibly abut the edges 10S (the rims) of the discs, so that the disc pick-and-place device 100 can perform a disc picking operation or a disc placing operation.

In the present embodiment, the picking members 120 are separately disposed on the supporting body 110 and flexibly abut the edges 10S of the discs 10 to form a positioning structure having at least three positioning points. The distance from each picking member 120 to the center of the discs is approximately equivalent to the radius of the discs 10, so that the picking members 120 can tightly abut the discs 10. Apart from clamping and unloading discs, the picking members 120 further provide a flexible guiding effect to avoid the discs 10 wobbling or tilting when being placed.

Refer to FIGS. 1B and 1C. Each picking member 120 includes a flexible rod 121, a first carrying portion 122 and a second carrying portion 123. In the present embodiment, the flexible rod 121 can be a round rod or can have other shape, and the invention is not limited thereto. Each flexible rod 121 is parallel to and extended to the edges 10S of the discs 10. The first carrying portion 122 and the second carrying portion 123 are located on the flexible rod 121 and separated by an interval, and partly overlap in an axial direction (Z direction) of the flexible rod 121. The interval is approximate 1-1.5 times of the thickness of a disc. The first carrying portion 122 and the second carrying portion 123 can be formed in one piece with the flexible rod 121. Or, the first carrying portion 122 and the second carrying portion 123 can be disposed on the flexible rod 121 additionally.

Refer to FIG. 1C. For the flexible rod 121 to provide sufficient flexibility, at least one first groove 124 (such as arced groove) and/or at least one second groove 125 (such as arced groove) are formed on the surface of the flexible rod 121. The first groove 124 faces a first direction (such as the X direction), the second groove 125 faces a second direction (such as the Y direction), and the first direction and the second direction are not the same. For example, the first direction is orthogonal with or opposite to the second direction. The first groove 124 is extended to a first plane, and the second groove 125 is extended to a second plane. The first plane is substantially parallel to the force receiving direction of the flexible rod 121. The first plane is substantially parallel to and not coplanar with the second plane. The first plane and the second plane are substantially parallel to or tilt at an angle to the radial direction of the flexible rod 121. Thus, when the flexible rod 121 clamps the discs 10, if the flexible rod 121 is affected by the discs 10 and protrudes outwardly, the flexible rod 121 will be flexibly bent through the first groove 124 and the second groove 125, and will restore to the erected state when the external force disappears.

The first groove 124 and the second groove 125 can be formed by performing a linear cutting process on the flexible rod 121. The flexible rod 121 can be formed of metal or plastics. The flexible rod 121 having been processed with the linear cutting process will be bendable and have better flexibility. However, the flexible rod 121 can also generate sufficient flexibility through the features of its material or structure, and the invention does not have particular restrictions thereto.

In an embodiment, the width of the first carrying portion 122 and the width of the second carrying portion 123 both are equivalent to or larger than ¼ of the circumference of the flexible rod 121. The first carrying portion 122 includes a first part P1 and a second part P2, and the second carrying portion 123 includes a third part P3 and a fourth part P4. The second part P2 and the third part P3 are located between the first part P1 and the fourth part P4 and overlap in the axial direction of the flexible rod 121, and the first part P1 and the fourth part P4 do not overlap in an axial direction of the flexible rod 121. For example, the first carrying portion 122 and the second carrying portion 123 overlap by ½ of the width, and do not overlap at the remaining width. However, the above values are for exemplary purpose only, not for limiting the invention.

In the present embodiment, the disc pick-and-place device 100 uses a driver 130 to drive each flexible rod 121, and therefore enters a first operating state, a second operating state, a third operating state or a fourth operating state, and make the first carrying portion 122 and the second carrying portion 123 move to a disc releasing position or a disc holding position to complete the disc picking operation or the disc placing operation.

Refer to FIG. 1A. The driver 130 includes a motor 132, a center gear 134 and multiple driven gears 136. The center gear 134 and the driven gears 136 are disposed on the supporting body 110 and engaged with each other. The motor 132 drives the center gear 134 and the driven gears 136 to rotate and make the disc pick-and-place device 100 switch among the first operating state, the second operating state, the third operating state and the fourth operating state. Apart from using gear transmission, the driver 130 can drive the picking members 120 and the flicking member 150 using belt transmission or multiple motors, and the invention is not limited thereto.

Refer to FIGS. 1B and 1D. The disc pick-and-place device 100 further includes a flicking member 150. The flicking member 150 includes a flexible rod 151, a wedge 152 and a carrying portion 153. In the present embodiment, the flexible rod 151 is a round rod. However, the flexible rod 151 can have other shapes, and the invention is not limited thereto. The flexible rod 151 is fixedly connected to and rotates along with one of the driven gears 136. Like the first carrying portion 122, the carrying portion 153 can move to a disc holding position or a disc releasing position. The driver 130 can concurrently drive the picking members 120 and the flicking member 150 to rotate, such that when the disc pick-and-place device 100 place a disc, the flicking member 150 can concurrently flick the disc. Besides, like the picking member 120, the flicking member 150 can have the first groove 124 and/or the second groove 125 formed thereon to provide a flexible bending effect when the disc pick-and-place device 100 clamps the discs 10.

Referring to FIGS. 2A-2D, schematic diagrams of an operating method of a disc pick-and-place device 100 are shown. Firstly, in FIG. 2A, multiple discs 10 are placed on a carrying plate 20 of a disc library, and the discs 10 include a first disc 11 and a second disc 12 counted in a bottom up manner. When the disc pick-and-place device 100 intends to pick up multiple discs 10, each flexible rod 121 is driven to rotate and make the disc pick-and-place device 100 enter a first operating state. In the first operating state, the center column 112 is inserted into the center hole of the discs 10, and each picking member 120 flexibly abuts the edges of the discs 10. Meanwhile, the first carrying portion 122 and the second carrying portion 123 are located at a disc releasing position. That is, the first carrying portion 122 and the second carrying portion 123 staggered with the edges 10S of the discs 10 without overlapping so that the disc pick-and-place device 100 can prepare to perform the disc picking operation.

Figure 2A:
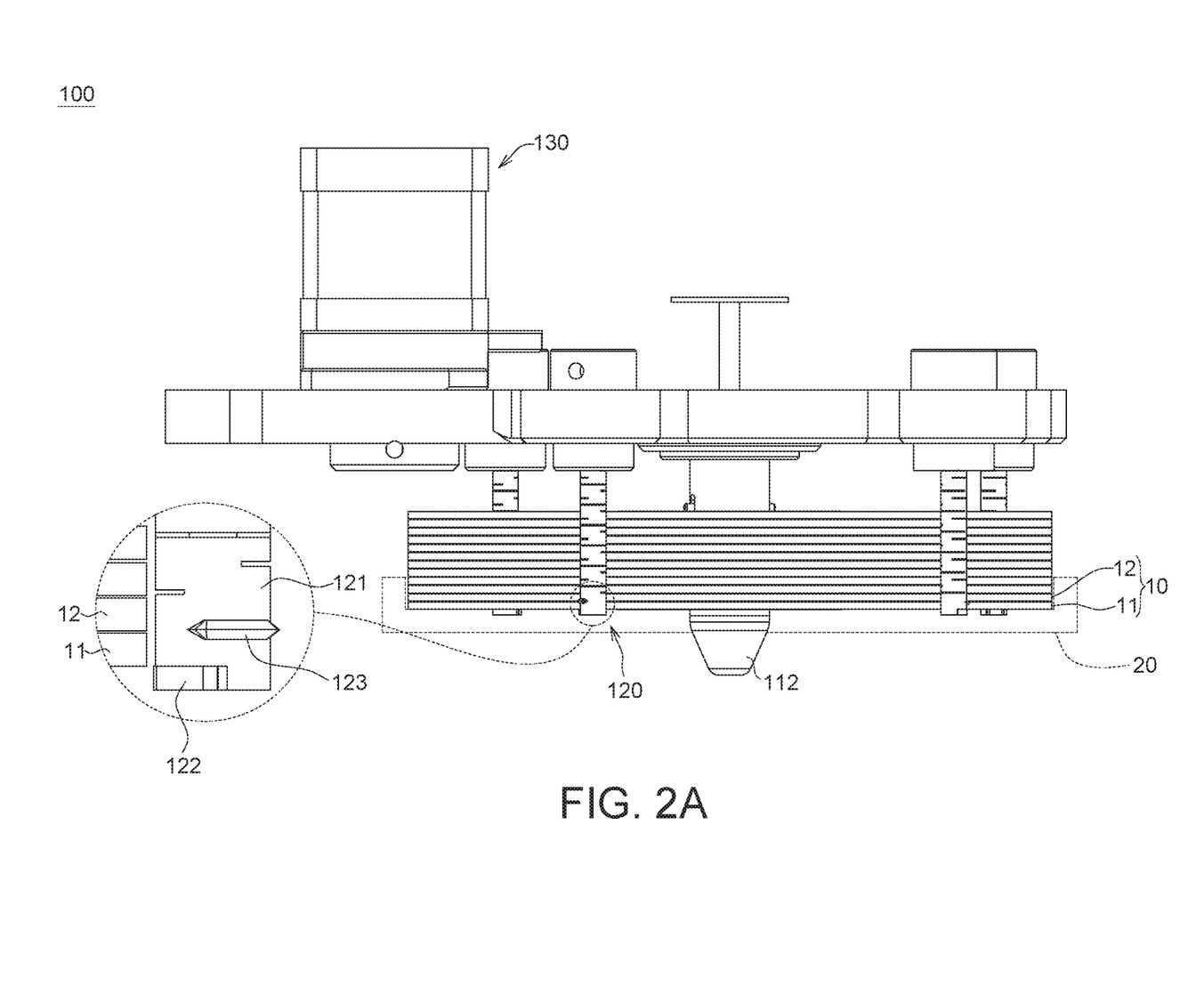
FIG. 2A is a schematic diagram of a disc pick-and-place device in a first operating state and an enlarged view of the leaning portion between the disc pick-and-place device and the discs.
Figure 2B:
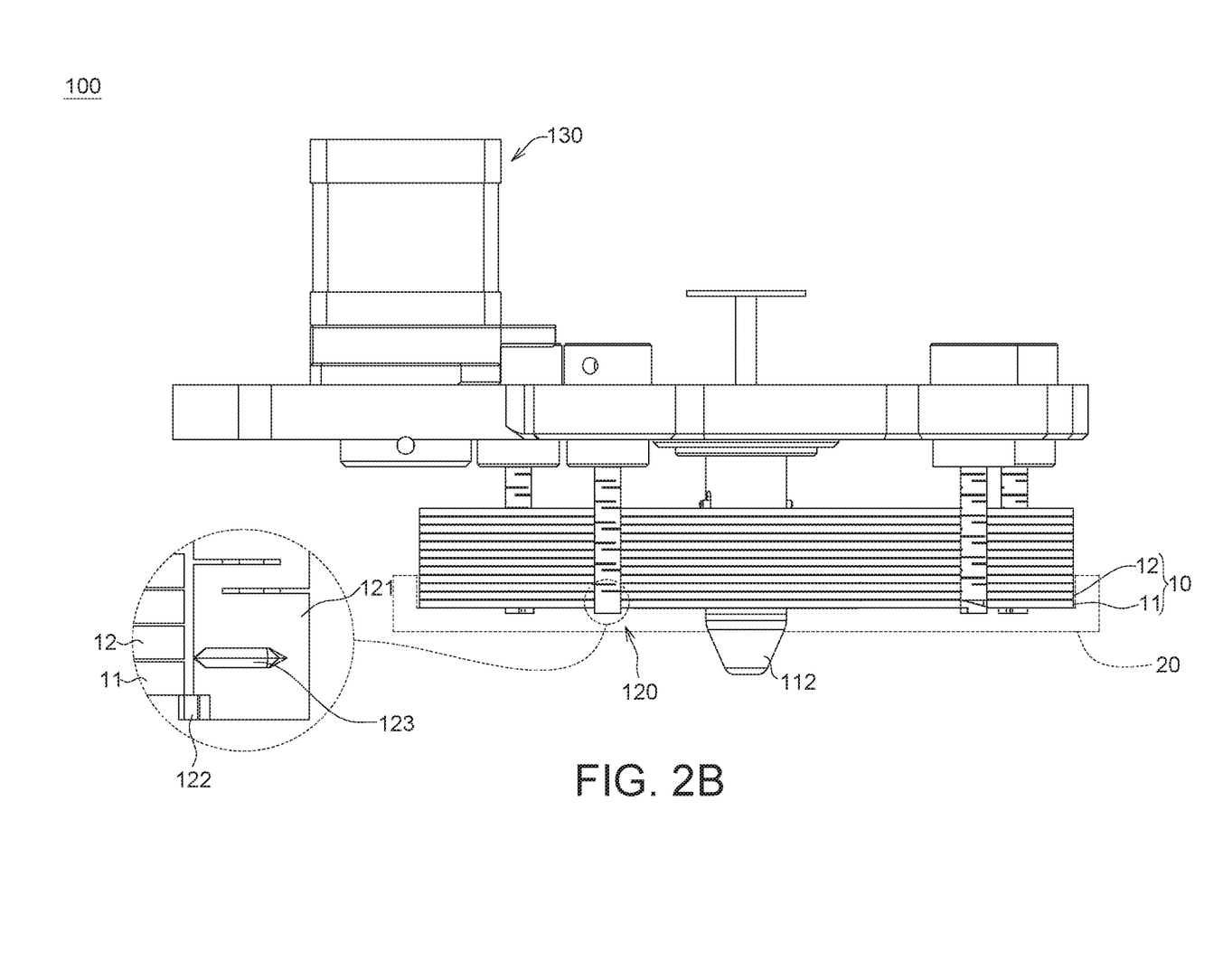
FIG. 2B is a schematic diagram of a disc pick-and-place device in a second operating state and an enlarged view of the leaning portion between the disc pick-and-place device and the discs.

Then, in FIG. 2B, the driver 130 drives each picking member 120 to rotate and make the disc pick-and-place device 100 enter a second operating state. In the second operating state, the first carrying portion 122 is located at the disc holding position, and the second carrying portion 123 is located at the disc releasing position. That is, the first part P1 of the first carrying portion 122 overlaps the edge of the first disc 11, and the second carrying portion 123 does not overlap the edge of the first disc 11. Therefore, in the second operating state, the discs 10 can lean on the first carrying portion 122. Meanwhile, the position of the first carrying portion 122 corresponds to the underneath of the first disc 11, so that the disc pick-and-place device 100 can clamp multiple discs 10. Then, the disc pick-and-place device 100 can move the clamped discs 10 to a corresponding disc drive 21 and prepare to perform the disc placing operation.

Figure 2C:
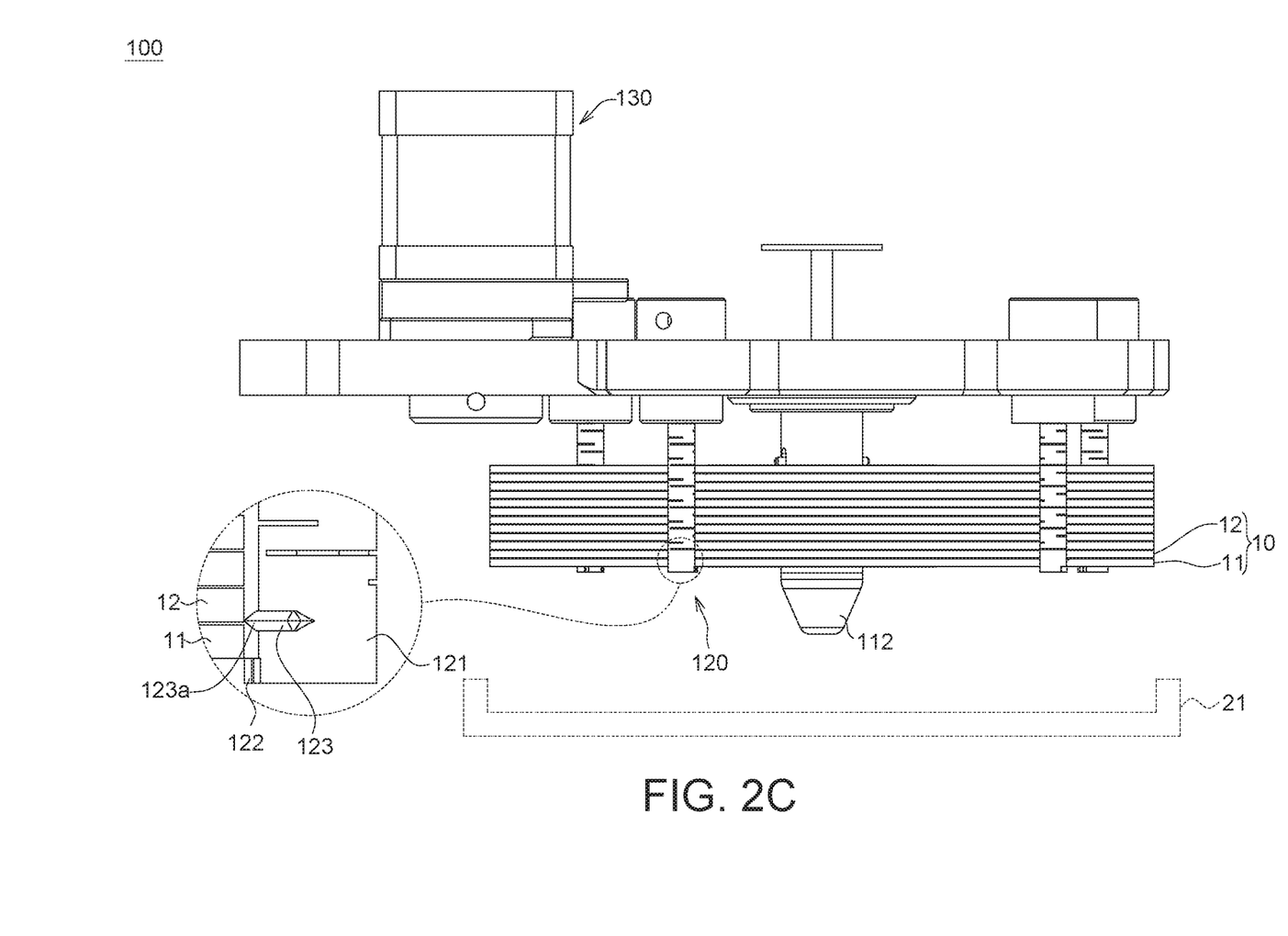
FIG. 2C is a schematic diagram of a disc pick-and-place device in a third operating state and an enlarged view of the leaning portion between the disc pick-and-place device and the discs.

In FIG. 2C, when the disc pick-and-place device 100 intends to unload the discs 10, the driver 130 drives each picking member 120 to rotate and make the disc pick-and-place device 100 enter a third operating state. In the third operating state, both the first carrying portion 122 and the second carrying portion 123 are located at the disc holding positions. That is, the second part P2 of the first carrying portion 122 corresponds to the edge of the first disc 11, and the third part P3 of the second carrying portion 123 corresponds to the edge of the second disc 12 and can be inserted into the space between the first disc 11 and the second disc 12 (as indicated in FIG. 2C) or directly abut the edge of the second disc 12 to hold the second disc 12. When the second carrying portion 123 directly abuts the second disc 12, the second carrying portion 123 will not damage the edge of the disc due to the flexibility of the flexible rod 121.

In an embodiment, the second carrying portion 123 has a conical tip 123a. When the disc pick-and-place device 100 is in the third operating state, the conical tip 123a of the second carrying portion 123 is inserted into the space between the first disc 11 and the second disc 12 to support the second disc 12.

Figure 2D:
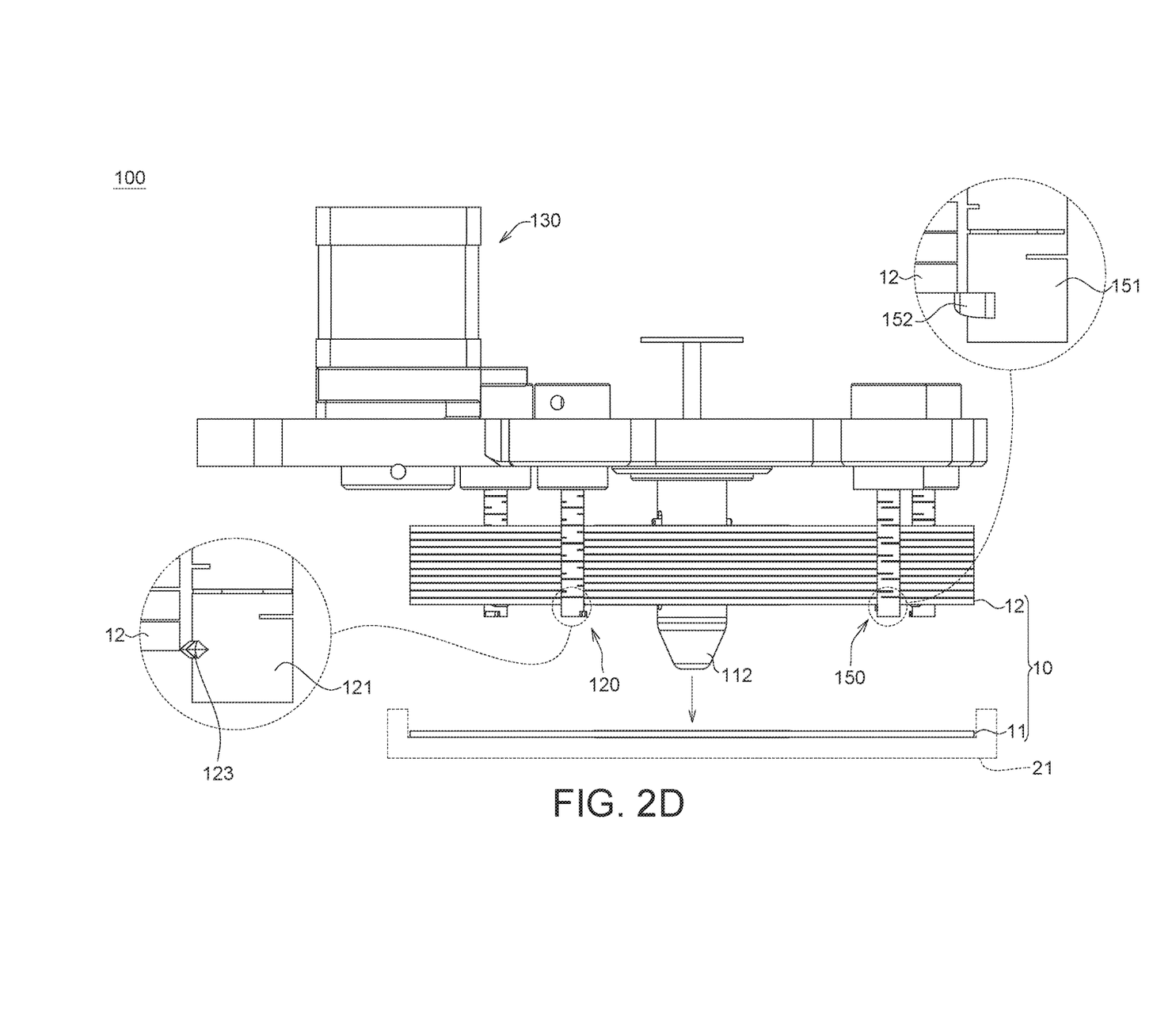
FIG. 2D is a schematic diagram of a disc pick-and-place device in a fourth operating state and an enlarged view of the leaning portion between the disc pick-and-place device and the discs.

Then, in FIG. 2D, the driver 130 drives each picking member 120 to rotate and make the disc pick-and-place device 100 enter a fourth operating state. In the fourth operating state, the first carrying portion 122 is located at the disc releasing position, and the second carrying portion 123 is located at the disc holding position. That is, the first carrying portion 122 staggers with the edge of the first disc 11 without overlapping, and the fourth part P4 of the second carrying portion 123 overlaps the edge of the second disc 12 and generates a holding effect. Therefore, in the fourth operating state, the first disc 11 cannot lean on the first carrying portion 122 and will be unloaded/placed to complete the disc placing operation. Then, the disc pick-and-place device 100 can move the clamped discs 10 to the next corresponding disc drive 21 to prepare for the next disc placing operation.

In FIG. 2D, when the disc pick-and-place device 100 enters the fourth operating state from the third operating state, the driver 130 drives the flexible rod 151 of the flicking member 150 to rotate to a disc flicking position at which the flexible rod 151 has a wedge 152 for separating the first disc 11 from the second disc 12. As indicated in FIGS. 1D and 2D, the width of the wedge 152 gradually increases from one end to the other end. When one end of the wedge 152 is inserted into the space between two adjacent discs and rotates, the gap between the two adjacent discs increases as the width of the wedge 152 increases, so that the disc pick-and-place device 100 can complete the disc flicking operation.

In an embodiment, given that the gap between the discs is not sufficient or the surface of the disc does not have printed ink and the discs 10 are stacked together and stored in a high temperature and high moisture environment over a period of time, the discs 10 will generate electrostatic adsorption and cannot be separated. In the present embodiment, the disc pick-and-place device 100 additionally has a flicking member 150 and uses the wedge 152 to increase the gap between the discs 10 to overcome the electrostatic adsorption of the discs 10, and therefore can separate and unload the discs 10.

In the present embodiment, next time when the disc pick-and-place device 100 intends to unload the discs 10, the driver 130 drives each flexible rod 121 to rotate in an reverse direction and makes the disc pick-and-place device 100 return to the second operating state from the fourth operating state (refer to FIG. 2B), and then drives each flexible rod 121 to rotate in a forward direction and make the disc pick-and-place device 100 enter the fourth operating state from the second operating state to complete a disc placing operation. By repeating the above steps, the next disc placing operation can be completed. By the same analogy, after all of the discs 10 are unloaded, the driver 130 drives each flexible rod 121 to rotate in an reverse direction and make the disc pick-and-place device 100 return to the first operating state (refer to FIG. 2A). Meanwhile, the first carrying portion 122 and the second carrying portion 123 both are located at the disc releasing positions, and the disc picking operation is performed again.

According to the disc pick-and-place device 100 and the operating method using the same disclosed in above embodiments of the invention, the driver drives multiple picking members to perform the disc picking operation and the disc placing operation. In comparison to the conventional design of clamping discs using a clamping structure disposed on the center column, the disc pick-and-place device 100 of the present embodiment has a simplified structure, effectively and quickly perform the disc picking operation and the disc placing operation, not only reducing the error rate but also avoiding the discs being scratched or damaged.

Figure 3A:
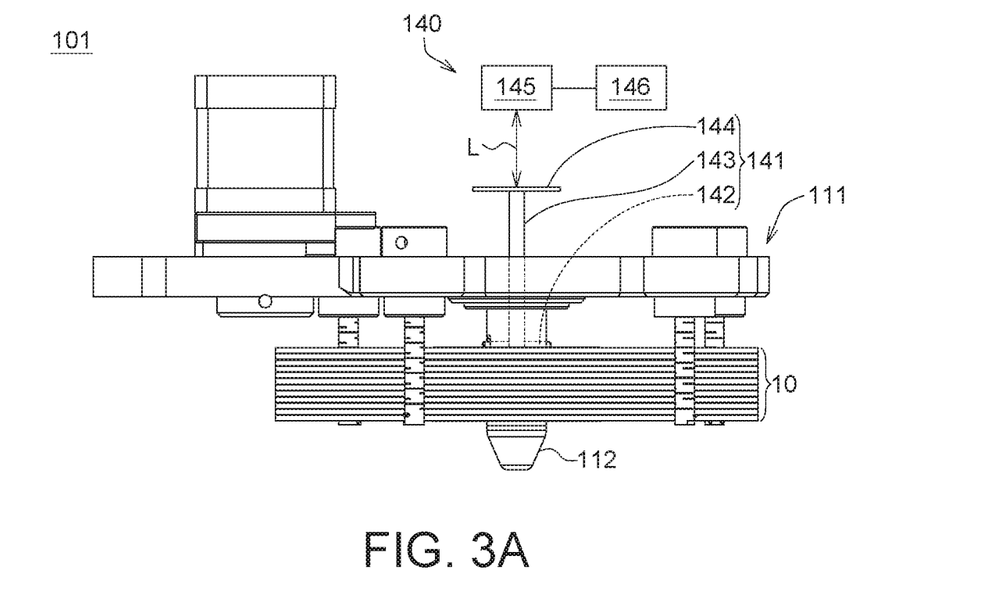
FIGS. 3A and 3B are perspective views of a disc pick-and-place device according to another embodiment of the invention.

FIGS. 3A and 3B are perspective views of a disc pick-and-place device 101 according to another embodiment of the invention. Refer to FIG. 3A. The disc pick-and-place device 101 includes a disc pick-and-place body 111 and a quantity sensing unit 140. The disc pick-and-place body 111 is for clamping and unloading at least one disc 10, and can be realized by the disc pick-and-place device 100 of the above embodiments or other types of disc pick-and-place device. For example, the center column 112 of the disc pick-and-place body 111 can be inserted into the center hole of the discs 10, and can pick up or unload the discs 10 by clamping the edge of the center hole of the discs 10 using a clamping structure (not illustrated) to perform the disc picking operation or the disc placing operation.

Besides, the quantity sensing unit 140 is disposed on the disc pick-and-place body 111 for sensing the quantity of the discs 10 clamped on the disc pick-and-place body 111. The quantity sensing unit 140 includes a movable piece 141 and an optical distance measuring device 145. The movable piece 141 leans on the discs 10 and moves as the quantity of the discs 10 changes. The optical distance measuring device 145 is for emitting a beam L and receiving the beam L reflected from the movable piece 141 to detect the quantity of the discs 10. The optical distance measuring device 145 can be realized by a laser distance measuring device or an infrared distance measuring device, and the invention is not limited thereto. The optical path traveled by the beam L is related to the height of the discs 10, and the quantity sensing unit 140 can obtain the quantity of the discs 10 according to the height of the discs 10.

Figure 3B:
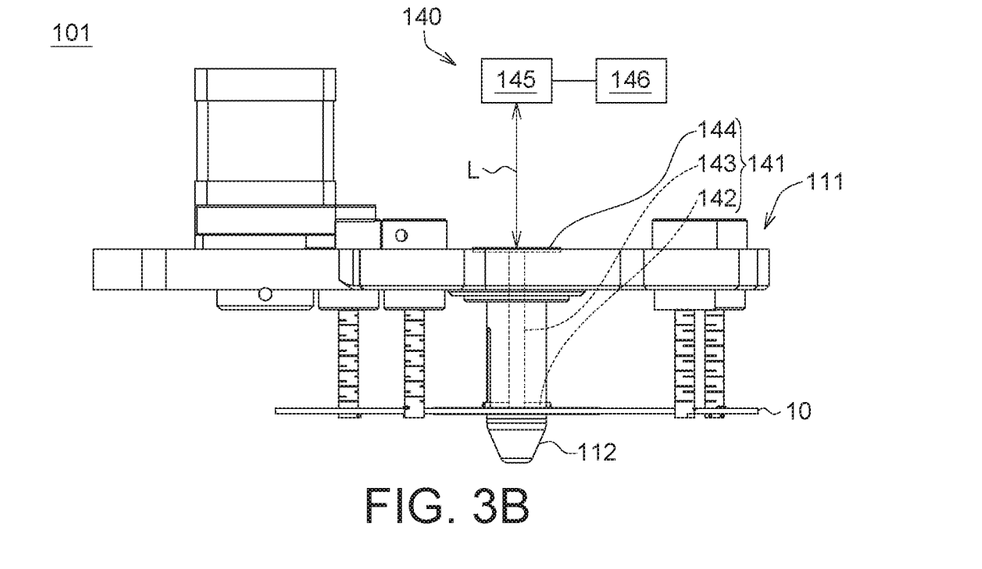

As indicated in FIGS. 3A and 3B, the height of the movable piece 141 reduces as the quantity of the discs 10 decreases. Therefore, the quantity sensing unit 140 can calculate the height of the movable piece 141 according to the reflective signal received by the optical distance measuring device 145 to obtain the quantity of the discs 10. Furthermore, the quantity sensing unit 140 can check whether the reduction in the height of the movable piece 141 each time a disc placing operation is completed is equivalent to the thickness of a disc according to the reflective signal received by the optical distance measuring device 145 to confirm whether the disc pick-and-place body 111 places one single disc in the disc placing operation.

Refer to FIG. 3A. The movable piece 141 is disposed on the center column 112 which can be inserted into the center hole 10C of the disc. The center column 112 has a hollowed portion. The movable piece 141 includes a movable rod 142, a supporting rod 143 and a reflective plate 144.

The movable rod 142 is disposed in the center column 112, and one end of the movable rod 142 is located outside the center column 112 and leans on the topmost disc of the discs 10, wherein the movable rod 142 moves as the quantity of the discs 10 changes. The supporting rod 143 is disposed in the center column 112 and orthogonally connected to the movable rod 142. The reflective plate 144 is disposed on the supporting rod 143 for reflecting the beam L. In the present embodiment, the movable rod 142, the supporting rod 143 and the reflective plate 144 are interconnected and form an I-shaped structure. Although the movable rod 142 contacts the discs 10, the center hole by which the movable rod 142 leans on the discs 10 is a disc clamping area, not a data area. The movable rod 142 can be designed to have an arced shape or the surface of the movable rod 142 can be formed of a soft material, such that the discs 10 will not be scratched when the movable rod 142 leans on the discs 10. Even when the movable rod 142 contacts the center hole of the discs 10, the movable rod 142 will not scratch or damage the data area of the discs 10.

The disc pick-and-place device 101 further includes a debug unit 146. The debug unit 146 is connected to the quantity sensing unit 140 for determining whether the quantity of the discs clamped on the disc pick-and-place device 101 is correct to control the disc picking and/or placing operation of the disc pick-and-place device 101. In the present embodiment, the debug unit 146 determines whether the disc picking operation or the disc placing operation is correct according to the disc quantity provided by the quantity sensing unit 140, and the next step is based on the above determination.

The operation steps of the disc pick-and-place device 101 are as follows. Firstly, before the disc pick-and-place body 111 picks up discs, the correct quantity of the discs to be picked up is set. Before the disc pick-and-place body 111 picks up discs, suppose the disc pick-and-place device 101 intends to pick up 12 discs, that is, a correct disc quantity is 12. Then, the disc pick-and-place body 111 picks up and clamps the discs 10 on the disc pick-and-place body 111. If the debug unit 146 determines that the quantity of the discs 10 clamped on the disc pick-and-place body 111 does not match the correct disc quantity (for example, too many or too little discs are picked up), the disc pick-and-place body 111 performs the disc picking operation again. If the debug unit 146 determines that the quantity of the discs clamped on the disc pick-and-place body 111 matches the correct disc quantity, the disc pick-and-place body 111 moves to a corresponding disc drive and prepares to perform the disc placing operation.

Similarly, before the disc pick-and-place device 101 places discs, the correct disc quantity after the discs are placed is set. Before the disc pick-and-place device 101 places discs, suppose the disc pick-and-place device 101 intends to unload 1 disc. That is, the correct disc quantity after one disc is placed is set as 11. After the disc pick-and-place body 111 places 1 disc, if the debug unit 146 determines that the quantity of the discs clamped on the disc pick-and-place body 111 matches the correct disc quantity, the disc pick-and-place body 111 moves to another corresponding disc drive and prepares to perform the next disc placing operation. If the debug unit 146 determines that the quantity of the discs clamped on the disc pick-and-place body 111 does not match the correct disc quantity (for example, too many or no discs are unloaded), the disc pick-and-place body 111 picks up the placed disc and performs the disc placing operation again.

The disc pick-and-place device 101 can repeat the above steps until all of the discs 10 clamped on the disc pick-and-place body 111 are unloaded.

According to the disc pick-and-place device and the operating method using the same disclosed in above embodiments of the invention, the determination of disc quantity is based on optical distance measurement, and the determined disc quantity is used as a basis for the disc picking/placing operation and error detection. Moreover, the invention does not need to reserve a space for the installation of the probe, not only dispensing with an additional installation structure, which would otherwise be required when the disc quantity is determined using a highly sensitive probe, but also avoiding the problem of disc surface being scratched or damaged when directly contacted by the probe.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc pick-and-place device, comprising:
a disc pick-and-place body for clamping and unloading at least one disc; and
a quantity sensing unit disposed on the disc pick-and-place body for sensing a quantity of the at least one disc clamped on the disc pick-and-place body, wherein the quantity sensing unit comprises:
a movable piece leaning on at least one disc and moving as the quantity of the at least one disc changes; and
an optical distance measuring device for emitting a beam and receiving the beam reflected from the movable piece to detect the quantity of the at least one disc,
wherein the movable piece is disposed on a center column, and the center column is inserted into a center hole of the at least one disc, and the movable piece comprises:
a movable rod disposed in the center column, wherein one end of the movable rod is located outside the center column and leans on the at least one disc, and the movable rod moves as the quantity of the at least one disc changes;
a supporting rod disposed in the center column and orthogonally connected to the movable rod; and
a reflective plate disposed on the supporting rod for reflecting the beam.

2. A disc pick-and-place device, comprising:
a disc pick-and-place body for clamping and unloading at least one disc; and
a quantity sensing unit disposed on the disc pick-and-place body for sensing a quantity of the at least one disc clamped on the disc pick-and-place body, wherein the quantity sensing unit comprises:
a movable piece leaning on at least one disc and moving as the quantity of the at least one disc changes;
an optical distance measuring device for emitting a beam and receiving the beam reflected from the movable piece to detect the quantity of the at least one disc; and
a debug unit connected to the quantity sensing unit for determining whether the quantity of the at least one disc clamped on the disc pick-and-place body matches a correct disc quantity,
wherein before the disc pick-and-place body picks up discs, the correct quantity of the discs to be picked up is set; after the disc pick-and-place body picks up discs, when the debug unit determines that the quantity of the at least one disc clamped on the disc pick-and-place body does not match the correct disc quantity, the disc pick-and-place body performs a disc picking operation again; when the debug unit determines that the quantity of the discs clamped on the disc pick-and-place body matches the correct disc quantity, the disc pick-and-place body moves to a corresponding disc drive and performs a disc placing operation; and
before the disc pick-and-place body places the discs, the correct disc quantity after the discs are placed is set; after the disc pick-and-place body places discs, when the debug unit determines that the quantity of the discs clamped on the disc pick-and-place body matches the correct disc quantity, the disc pick-and-place body moves to another corresponding disc drive and performs the disc placing operation; when the debug unit determines that the quantity of the discs clamped on the disc pick-and-place body does not match the correct disc quantity, the disc pick-and-place body picks up the placed discs and performs the disc placing operation again.

3. An operating method of a disc pick-and-place device, wherein the disc pick-and-place device comprises a disc pick-and-place body and a movable piece, the disc pick-and-place body is for clamping and unloading at least one disc, the movable piece leans on at least one disc and moves as the quantity of the at least one disc changes, wherein the movable piece is disposed on a center column, and the center column is inserted into a center hole of the at least one disc, and the movable piece comprises: a movable rod disposed in the center column, wherein one end of the movable rod is located outside the center column and leans on the at least one disc, and the movable rod moves as the quantity of the at least one disc changes; a supporting rod disposed in the center column and orthogonally connected to the movable rod; and a reflective plate disposed on the supporting rod for reflecting a beam, the operating method comprising:
emitting the beam and receiving the beam reflected from the movable piece to detect a quantity of the at least one disc; and
determining whether the quantity of the at least one disc clamped on the disc pick-and-place body matches a correct disc quantity.

4. The operating method according to claim 3, wherein before the disc pick-and-place body picks up discs, the correct quantity of the discs to be picked up is set; after the disc pick-and-place body picks up discs, when it is determined that the quantity of the at least one disc clamped on the disc pick-and-place body does not match the correct disc quantity, the disc pick-and-place body performs a disc picking operation again; when it is determined that the quantity of the discs clamped on the disc pick-and-place body matches the correct disc quantity, the disc pick-and-place body moves to a corresponding disc drive and performs a disc placing operation; and before the disc pick-and-place body places the discs, the correct disc quantity after the discs are placed is set; after the disc pick-and-place body places the discs, when it is determined that the quantity of the discs clamped on the disc pick-and-place body matches the correct disc quantity, the disc pick-and-place body moves to another corresponding disc drive and performs the disc placing operation; when it is determined that the quantity of the discs clamped on the disc pick-and-place body does not match the correct disc quantity, the disc pick-and-place body picks up the placed discs and performs the disc placing operation again.

* * * * *